(No Model.)
W. D. ARNETT.
SEEDING MACHINE.
No. 358,248. Patented Feb. 22, 1887.
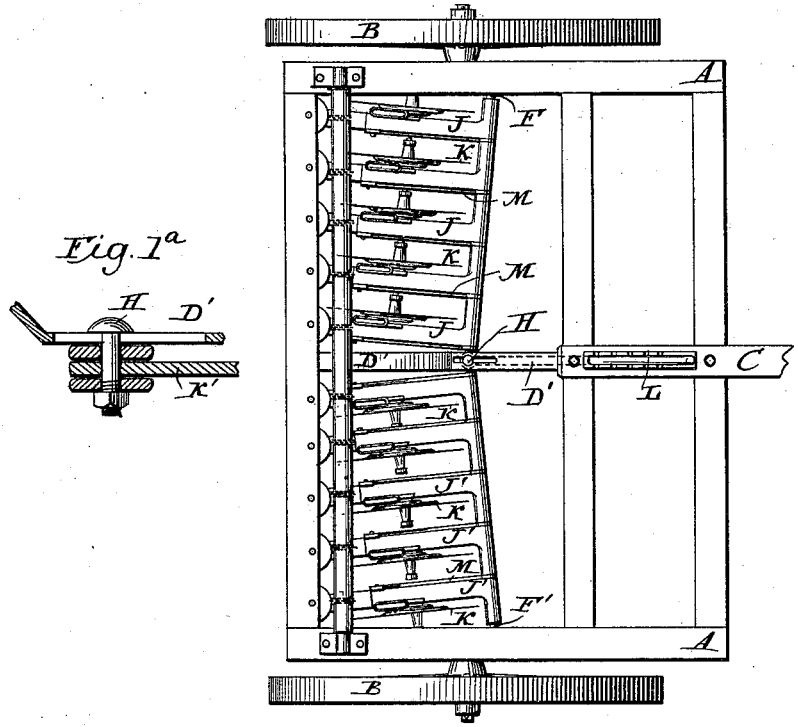
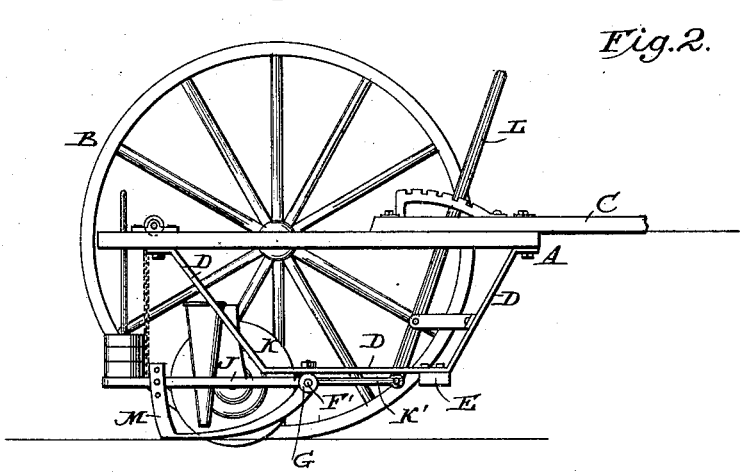
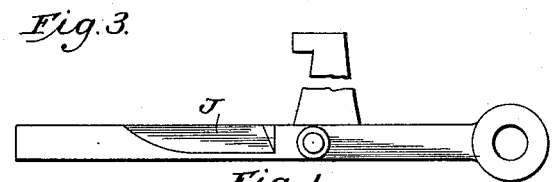
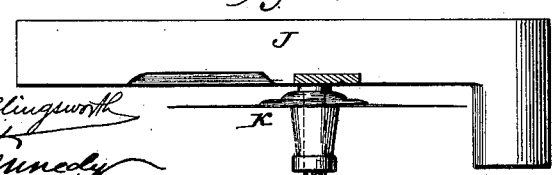
Attest: Sidney P. Hollingsworth, W. R. Kennedy
Inventor: W. D. Arnett
By his Atty P. T. Dodge

UNITED STATES PATENT OFFICE.

WILLIAM D. ARNETT, OF DENVER, COLORADO.

SEEDING-MACHINE.

SPECIFICATION forming part of Letters Patent No. 358,248, dated February 22, 1887.

Application filed November 11, 1886. Serial No. 218,515. (No model.)

*To all whom it may concern:*

Be it known that I, WILLIAM D. ARNETT, of Denver, in the county of Arapahoe and State of Colorado, have invented certain Improvements in Seeding-Machines, of which the following is a specification.

This invention relates to that class of machines in which the seed-receiving furrows are opened by means of upright rotary disks arranged in planes oblique to the line of travel, as represented, for example, in various Letters Patent of the United States heretofore granted to me.

The aims of the present invention are, principally, to provide in a practical manner for the independent vertical motion of the disks, so that they may follow the inequalities in the surface of the soil, and to provide for changing the inclination or obliquity of the disks with reference to the line of travel at will.

In the accompanying drawings, Figure 1 represents a top plan view of a machine having my improvements embodied therein. Fig. 1ª is a detail sectional view. Fig. 2 is a side elevation of the same, one of the ground-wheels being removed to expose the other parts to view. Fig. 3 is a side elevation of one of the drag-bars. Fig. 4 is a top plan view of the same with the disk mounted thereon.

Referring to the drawings, A represents the rigid main frame, which may be of any suitable construction and of any appropriate form, preferably rectangular. The frame is provided with journals or axles which receive the two supporting-wheels B, and is also provided, as usual, with a central draft pole or tongue, C. To the under side of this frame I bolt firmly three longitudinal bars, D, D, and D', the first two on opposite sides, and the latter in the middle. These bars, which are attached at their ends, have their middle portions carried below the frame and arranged in a horizontal position. They are preferably connected at their forward ends by a cross-bar, E, which gives increased rigidity to the structure.

F F' represent two horizontal shafts, arranged transversely beneath the frame end to end, their outer extremities being mounted in bearings G, swiveled to the bars D, while their inner ends are connected, by a vertical pivot-bolt, H, to a bearing-block arranged to slide longitudinally and horizontally in the middle bar, D'. By moving this slide the inner ends of the two shafts may be carried forward or backward, and the horizontal angle of the shaft with reference to the line of draft changed at will.

On the respective shafts I mount the forward ends of a series of drag-bars, J and J', which are extended thence rearward and provided each on its side with a furrow-opening disk, K. The drag-bars may be made of any appropriate form and connected to the shaft in any suitable manner which will admit of their rear ends swinging vertically, but prevent them from swinging laterally in relation to the shaft. I prefer to form each bar, as shown, at its forward end with an eye or socket, through which the supporting-shaft passes, these sockets being extended on the inner side for the purpose of maintaining the proper separation between the bars. The disks, which may be formed in any appropriate manner, are arranged to revolve on journals projected from the sides of the drag-bars. As the inner ends of the shafts F are carried to the rear, the rear ends of the drag-bars are thrown laterally toward the outside of the machine, giving the disks a greater angle in reference to the line of progression, and causing them to produce furrows of increased width.

It will be observed that the two series of drag-bars and disks at opposite sides of the machine diverge in opposite directions from the line of travel, so that the lateral pressure of one series is opposed or resisted by that of the other. In this manner the machine is prevented from working sidewise and from swinging in such manner as to exert a side pressure on the team.

The slide by which the drag-bars are adjusted may be operated in any suitable manner. In order that it may be quickly adjusted while the machine is in action, I connect it, by a rod, K', to the lower end of a hand-lever, L, which is pivoted in the frame and extended upward in position to be conveniently manipulated by the driver. The essence of my invention in this regard lies in the connection of the drag-bar supports to the frame so that their horizontal angles may be changed, and it is manifest that the details of construction may be modified in various respects, which will suggest themselves to the skilled mechanic, without, in fact, changing essentially the mode of action or departing from the limits of my invention.

In order to regulate the depth to which the disks enter the soil, I provide each drag-bar with a shoe or runner, M, hung at its forward end upon the shaft which carries the drag-bar, and extending thence downward upon the surface of the ground to a point near the rear end of the drag-bar, where it is turned upward therethrough, its upper end being provided with a series of holes to receive the fastening pin or bolt and to permit of its vertical adjustment.

I am aware that an adjustable shoe in a form and arrangement differing from that shown in the drawings has been used in connection with a drag-bar carrying a furrow-opening disk, and I therefore lay no broad claim to such combination.

I am also aware that a furrow-opening disk has been connected to a drag-bar by adjustable devices which permit the position of the disk with reference to the drag-bar to be changed; but I believe myself to be the first to provide means whereby the drag-bars carrying the disks may be changed in position as regards their horizontal angle to the line of travel.

Having thus described my invention, what I claim is—

1. In a seeding-machine, the combination, substantially as described, of the wheeled frame, the vertically-swinging drag-bar attached adjustably to the frame so that its angle to the line of travel may be changed, and the furrow-opening disk attached to said drag-bar.

2. In a seeding-machine, the combination of a wheeled frame, a series of drag-bars each provided with a furrow-opening disk, and a transverse shaft or rod to which the drag-bars are jointed to swing vertically and independently, said shaft connected adjustably to the frame, substantially as described, so that its angle to the line of travel may be changed, whereby the obliquity of the disks to the line of progression may be varied to produce wide or narrow furrows, as demanded.

3. In a seeding-machine, the combination of a wheeled frame, a series of drag-bars each provided with a furrow-opening device, a swiveling support connecting the shaft at one end to the frame, and a longitudinally-movable support connecting the shaft at the opposite end to the frame, whereby the angle of the drag-bars to the line of travel may be changed at will.

4. The wheeled main frame, in combination with the two series of drag-bars, the two shafts sustaining the drag-bars of the respective series, the swiveling bearings at the outer ends of the shafts, the sliding bearing at their inner ends, and the operating-lever connected with the last-named bearing, whereby the two series of bars may be adjusted in opposite directions as regards their horizontal obliquity to the line of travel.

5. In combination with the wheeled frame, a transverse shaft secured thereto, a drag-bar journaled on said shaft to swing vertically, a furrow-opening disk attached to the drag-bar, and a shoe or runner jointed at its forward end on said shaft, and adjustably attached at its rear end to the drag-bar.

6. In a seeding-machine, a wheeled frame, in combination with a series of vertically and laterally swinging drag-bars attached thereto and provided with furrow-opening disks, a hand-lever, and intermediate connections, substantially as described, whereby the lever is enabled to effect the lateral swinging movement of the beams.

7. The combination of the main frame, its wheels, the arms attached to the frame, the two shafts, the drag-bars mounted thereon, the bearings at their outer ends, and the sliding bearings at their inner ends.

WILLIAM D. ARNETT.

Witnesses:
W. J. ACHESON,
W. F. HALLOWELL.